United States Patent [19]
Hotier et al.

[11] Patent Number: 5,972,224
[45] Date of Patent: Oct. 26, 1999

[54] PROCESS AND DEVICE FOR IMPROVING THE PURITY OF A PRODUCT IN A SIMULATED FLUID BED

[76] Inventors: Gerard Hotier, 39, avenue Berthelot, Mailmaison, France, 92500; Pierre Renard, 8, Allee des Romarins, Saint Nom La Breteche, France, 78860; Annick Pucci, 1, allee des Demoiselles, Croissy Sur Seine, France, 78290; Didier Pavone, 7, chemin de la Pinede, Ecully, France, 69130

[21] Appl. No.: 09/042,572

[22] Filed: Mar. 17, 1998

[30] Foreign Application Priority Data

Dec. 22, 1997 [FR] France ...................................... 9716273

[51] Int. Cl.[6] ......................................................... B01D 15/08
[52] U.S. Cl. .......................................... 210/659; 210/198.2
[58] Field of Search ...................................... 210/635, 656, 210/659, 662, 198.2

[56] References Cited

U.S. PATENT DOCUMENTS

| | | | |
|---|---|---|---|
| 2,985,589 | 5/1961 | Broughton et al. | 210/198.2 |
| 3,214,247 | 10/1965 | Broughton | 210/198.2 |
| 3,268,605 | 8/1966 | Boyd, Jr. | 210/662 |
| 3,789,989 | 2/1974 | Carson | 210/284 |
| 4,378,292 | 3/1983 | Hasse | 210/266 |
| 5,422,007 | 6/1995 | Nicoud | 210/659 |
| 5,578,215 | 11/1996 | Hotier | 210/659 |
| 5,578,216 | 11/1996 | Hotier | 210/659 |
| 5,582,736 | 12/1996 | Hotier | 210/659 |
| 5,755,960 | 5/1998 | Callebert | 210/659 |
| 5,762,806 | 6/1998 | Hotier | 210/659 |
| 5,846,411 | 12/1998 | Harter | 210/659 |
| 5,882,523 | 3/1999 | Hotier | 210/659 |

FOREIGN PATENT DOCUMENTS

0 769 316 a1   4/1977   European Pat. Off. ............... 210/659

*Primary Examiner*—Ernest G. Therkorn
*Attorney, Agent, or Firm*—Millen, White, Zelano & Branigan

[57] ABSTRACT

The device comprises at least one column 1 that is filled with a number of beds $A_n$ having an adsorbent that are separated by a fluid distributor plate $P_i$. Each plate is divided into a number of sectors $P_{10}$ and $P_{11}$, and each sector comprises at least one fluid distribution chamber 13 that is pierced with openings and a circulation space 8 in the vicinity of the openings. The chambers of the plate are connected to a line 10 for transfer to the outside. With respect to the chambers on a plate, transfer line 10 $P_i$ is connected to another transfer line 20 relative to chambers 23 on another plate ($P_{i+1}$ or $P_{i+2}$) that is arranged downstream by a bypass line $L_{1,2}$. The latter comprises means 14, 15, 16 for monitoring and adjustment of the flow of fluid that circulates there, such that the distribution chambers are flushed by a fluid which has approximately the same composition as that of the fluid that circulates through circulation space 8 at each of the chambers.

26 Claims, 4 Drawing Sheets

PROCESS AND DEVICE FOR IMPROVING THE PURITY OF A PRODUCT IN A SIMULATED FLUID BED

The invention relates to a device for improving the purity of at least one component in a mixture that Circulates through a solid adsorbent or a solid catalyst, as well as the process that makes its operation possible.

The invention relates particularly to a process for chromatographic separation of at least one aromatic isomer with 8 carbon atoms in a simulated fluid bed in a mixture of xylenes and ethylbenzene that contain it and preferably paraxylene, for the synthesis of terephthalic acid, an intermediate petrochemical in the production of textiles.

More generally, it relates to the separation of at least one isomer in a mixture of components that contains at least one aryl group to which is attached at least one alkyl group.

Finally, it relates to the separation of at least one component in a mixture for which any chromatographic separation for adsorption or ion exchange, for example, is used.

The reactors or adsorbers that are now used are becoming increasingly bulky to handle an increasingly large demand for the desired product.

Furthermore, the desired product should reach a purity that exceeds 99.5%, which is not a priori compatible with the volume of the batch that is to be processed and therefore with very large reactor capacities.

The technological background that illustrates the use of an adsorption device with simulated countercurrent is described in U.S. Pat. No. 2,985,589.

This device comprises at least one cylindrical column that contains an overall cylindrical solid mass and has an approximately annular section.

A main fluid that is introduced by a pump flows through the solid bed along the central axis of the column, according to a flow that it is desired to designate a piston type flow (plug flow). In other words, the fluid should have a composition and a front flow that are uniform at all points of the section of the column.

A device such as that described in U.S. Pat. Nos. 3,214,247 and 4,378,292, which are included as references, makes it possible to accomplish this objective. It generally includes a number of beds of an adsorbent, supplied by a number of distributor plates, whereby each bed is supported by an upper grid that is approximately perpendicular to the axis of the reactor and makes it possible for the fluid to flow. Each plate is divided into sectors, and each segment of the distributor plate comprises two deflectors that are unperforated, flat, or overall tapered (of variable thickness) and that are arranged on the same horizontal plane, between which a circulation space for the fluid is arranged. A lower grid under the deflectors makes it possible to distribute the fluid uniformly in the lower bed of adsorbent.

At each distribution plate, at least four transfer lines for secondary fluids (batch injection line, desorbant injection line, line for drawing off an extract, and line for drawing off a refined product) that include a set of valves are connected to means for switching this set of valves.

The injection and draw-off of these fluids are accomplished between certain beds that define zones, and within a regular space of time called period T the points of introduction and draw-off that delimit the zones of the interval between beds ($c_k$) and, ($c_{k+1}$) are moved by the interval between beds ($c_{k+1}$) and ($c_{k+2}$).

If n is the number of beds, n×T defines the cycle period. A recycling pump recycles the fluid from the bottom of the column to the top.

The secondary fluids (batch or desorbant) are introduced or drawn off (extract, refined product) into or from the circulation space via an introduction or draw-off chamber that is pierced with openings.

Each distributor plate can be divided into sectors. According to U.S. Pat. No. 3,789,989, each plate sector, which is delimited by radial walls, comprises a chamber for introducing or drawing off secondary fluid.

In the case where the distributor plate of each sector contains only a single chamber, each chamber of a given sector is connected by a pipe to a single supply or draw-off line that is connected to the outside of the column.

According to Patent Application EP-A-769316, each secondary fluid is introduced or drawn off via its own introduction or draw-off chamber, which uses a number of openings opposite the circulation space. The upper and lower walls of these chambers constitute the deflectors that are mentioned above. Therefore, when the distributor plate of each sector includes several chambers, each chamber of a bed sector is connected by a pipe to a line that is intended to receive only a single fluid either to supply the appropriate chamber with desorbant or with batch or to draw off from the appropriate chamber the refined product or the extract. Thus, for example, if each sector comprises four chambers, one intended for the batch, the second for desorbant, the third for refined product, and the fourth for extract, the chamber CF of the given sector that receives batch F will be connected to a line that receives all of the pipes of different chambers CF pertaining to the same adsorbent bed.

In a paraxylene separation unit that operates with a simulated fluid bed and that comprises two adsorbers that are arranged in series of twelve beds each with a molecular sieve, a deformation (or drag) of the longitudinal concentration sections, which is reflected by a lack of performance relative to the ideal performance expected, has been noted.

In particular, the drag of the concentration in impurities at the draw-off of the extract is reflected by a significant reduction in the purity of the extract (less than 99%) relative to the purity expected (greater than 99.5%).

The analysis of the problem that was performed on the separation unit showed that these deformations (or drags) of the longitudinal concentration sections were due to parasitic circulations through each of the distribution chambers that are arranged in the sectors of each plate during periods when fluid is neither introduced nor drawn off through the chamber in question.

This is, in particular, wow, i.e., the exchange of material due to turbulence at the openings of the distribution chambers between the main fluid which circulates in the circulation space and the fluid that is contained in the chambers. This phenomenon is known for producing weak drag.

This is also mainly recirculation of a distribution chamber of a plate sector to the chamber that is similar to another sector of the same plate, via the coupling pipe that connects these chambers to one another and to the line for transfer to the outside of the adsorber.

This recirculation is due to small pressure differences that exist between the sectors of the same plate. In theory, this pressure should be the same throughout the same plate. In practice, small differences exist because of various imperfections such as the imperfections of flow of the main fluid through the adsorbent beds and, for periods when secondary fluid is neither introduced nor drawn off in a chamber, this induces a recirculation of a portion of the main fluid that is picked up at the circulation space of a sector where the pressure is higher, to the circulation space of a sector where the pressure is lower via the openings of the chambers in question.

The portion of main fluid that is recirculated enters one of the chambers by passing through the openings of the chamber in question that belongs to the highest pressure sector.

This portion of fluid then advances to the similar chamber that belongs to the lower pressure sector via the coupling pipe that connects these chambers to one another.

Finally, this portion of the fluid joins the main fluid in the circulation space of the lower pressure sector by passing through the openings in the chamber of this sector.

The recirculation flow between two sectors of the same plate is a function of the pressure differences that exist between these two sectors, as well as of the size of the openings of the chambers of the sectors in question.

The dwell time of the fluid that recirculates in this way from a chamber of a sector to the corresponding chamber of another sector is itself a function of the volume of the source and destination chambers, of the volume of the pipe that connects them, and of the recirculation flow between these chambers.

If the plate comprises multiple sectors, there will be a combined general recirculation from the sectors where the pressure is the highest to the sectors where the pressure is the lowest, with this recirculation being accomplished with a mean overall dwell time TR.

In this unit that operates in a simulated fluid bed, the composition of the main fluid at a plate varies constantly as a function of time. This is due to the advance of the longitudinal concentration section, which moves under the action of the circulation of the main fluid.

In view of the parasitic recirculation that is observed, it follows that, at a plate that is taken at a given instant, the main fluid that has a given composition arrives, on the one hand, and, on the other hand, the portion of the main fluid that is recirculated from one portion of the sectors to the other sectors of this same plate also arrives, whereby the latter portion has a composition that corresponds to that which the main fluid had one moment beforehand, with the offset in time being equal to dwell time TR of the portion of recirculated fluid.

Everything therefore happens as if a portion of the main fluid reached each plate with a certain delay that is equal to dwell time TR.

The mixing of this portion of recirculated fluid, with a delay, with the main fluid modifies the overall composition of the combined fluid and therefore causes systemic backmixing at each plate. This induces a deformation, or drag, of the longitudinal concentration sections, and is reflected by a loss of performance such as the reduction in the purity of the extract that can reach, for example, up to a point.

To avoid this problem, it is possible to consider eliminating the circulation of fluids in the chambers by means of nonreturn valves that are arranged on the lines for access to the chambers, but this solution proves to be impractical since the fluid, in the case of a single chamber, can circulate in one direction or the other. Moreover, these valves can pose insoluble maintenance problems due to their inaccessibility.

The object of the invention is to remedy the drawbacks of the prior art.

Another object is to improve the purity of the desired product, and especially in the case of reactors or adsorbers that have very large diameters.

More specifically, the invention relates to a process for chromatographic separation of a batch in a device in a simulated fluid bed that comprises a number of beds (A1 to An) of a solid or adsorbent, whereby said beds are contained in at least one chromatographic column, a fluid distributor plate between each bed, whereby each distributor plate is divided into a number of sectors, whereby each distributor plate sector comprises at least one distribution chamber that is pierced with openings and a fluid circulation space in the vicinity of said openings of the chamber, and whereby said chamber is connected to a transfer line that extends between the chamber and a point that is located outside of the column; during a period T of the cycle, an injection of the batch, a draw-off of a refined product, injection of desorbant, and draw-off of an extract into and from a distribution chamber that belongs to different plates are carried out, with the process being characterized in that at an appropriate flow there is permanently circulated a fluid volume that circulates in the column in a bypass line that connects the chambers of a distributor plate $P_i$ to the chambers of another downstream distributor plate $P_{i+j}$, at least one bed away, for at least one period T of the cycle, whereby period T corresponds to the circulation period of the fluid in a solid bed, whereby said distribution chambers receives, during said period, neither batch injection or desorbant injection nor the draw-off of a refined product or an extract, and whereby the fluid flow circulating in the bypass line and in the chambers is adjusted in such a way that said circulation chambers are flushed by a fluid that has approximately the same composition as that of the fluid that circulates through the circulation space at each of plate chambers Pi and Pi+j.

The position of the plate that is located downstream is defined relative to the direction of advance of the points of draw-off and introduction during switching sequences.

By proceeding according to the process, any stagnation of residual fluid in the distribution chambers is avoided. The distribution chamber, of which the fluid (the main so-called pump-around fluid) is drawn in, has circulating through it a fluid whose composition is approximately that of the fluid which at the same time passes through the circulation space in the distributor plate that connects one adsorbent bed to another adsorbent bed.

Likewise, the circulation chamber into which fluid is introduced via the bypass line has circulating through it a fluid whose composition is approximately that which passes through said circulation space at the same time.

Under these conditions, it has been observed that a very advantageous purity at the level of the desired product, for example, paraxylene (more than 99.8%) and an output that is greater than 95%, are obtained in a simple manner and with elimination of the perturbation that affects the concentration section that flows in the adsorbent beds.

Furthermore, it has been observed that it is no longer necessary to rinse out the stagnant residual fluid before the operation of drawing off the extract, to the extent that the process according to the invention ensures permanent rinsing of the lines. Introducing one or two additional zones and therefore additional lines and valves is then avoided, and at the same time a drop in the productivity of the desired product is avoided.

According to one characteristic of the process, the distributor plate chambers that are connected by the bypass line can be separated by an adsorbent bed. In this case, the fluid flow that circulates in the bypass line is usually approximately the quotient of the volume that is available in the distribution chambers in question, and the bypass line between the transfer line portions between two successive plates of chambers, divided by the period of the cycle.

It can be verified that this flow is greater than the natural circulation flow of fluid due to small pressure differences (for example, several grams per $cm^2$) that are present between the same chambers of sectors of the same plate.

According to another characteristic, they can be separated by two adsorbent beds, with the bypass line being connected between plate $P_i$ and plate $P_{i+2}$ downstream. In this specific case, the fluid flow is reduced since the length of the bypass line and mainly the circulation period that corresponds to two periods are taken into account.

By making the fluid circulate between two distant plates of two beds, a higher pressure drop that more reliably dictates the direction of circulation of the fluid in the bypass line is also achieved.

Means for monitoring and adjusting the fluid flow that circulates in the chambers and the bypass line are arranged on the latter. The latter can comprise a calibrated line as a function of the volumes that are brought into play by the bypass between two beds and as a function of the circulation period of the fluid in order to obtain the appropriate flow.

A nonreturn valve that is arranged on this bypass line downstream from said means prevents any reflux of liquid upstream.

An all-or-nothing valve that is arranged on the bypass line can furthermore keep any fluid from circulating in one direction or the other.

A pump that connects the two chambers and that is arranged on said line upstream from these means of monitoring and adjustment can facilitate the circulation of the fluid in this line.

It is possible to accept a tolerance of ±50% around the calculated value of the flow, particularly in the absence of automatic slaving of the flow control, advantageously ±25% and preferably ±15%, without the performance levels, i.e., the purity of the desired product, expressed as a function of the flow of bypass fluid, being substantially affected.

The distributor plate can comprise only a single distribution chamber per sector. According to a first variant of the process, it is possible to cancel, for a period, the flow of the fluid that circulates in the bypass line between distribution plates (Pi and Pi+1) when the chambers in question of distributor plate Pi receive the injection of a batch of desorbant or any other fluid (rinsing flush-in) or the draw-off of the refined product or extract or any other fluid (flush-out).

According to a second variant of the process, during the period of drawing-off of an extract or a refined product, on a given distributor plate that comprises only a single chamber per sector, the extract or the refined product is drawn off from plate $P_1$, with the bypass flow being canceled (by the nonreturn valve), and during the following period, the extract or the refined product of plate $P_{i+1}$ and of plate $P_i$ is drawn off, with the circulation of fluid in the bypass line being reestablished.

During the period of injecting batch or desorbant, it is possible to introduce a portion of the batch or desorbant into a suitable plate $P_i$ via the bypass line, and during the subsequent period the entire batch is sent into following distributor plate $P_{i+1}$, with the bypass flow being canceled (by the nonreturn valve).

The distributor plate can comprise per sector two, three, or four distribution chambers, advantageously two, since the flow of fluid that circulates in all of the beds of the same zone is kept approximately constant.

In the case where it comprises two, according to a first variant, a first chamber can be intended to receive a draw-off of extract or refined product and a second is intended to receive the introduction of batch or desorbant. According to a second variant of a distributor plate with two chambers per sector, a first chamber can be intended to receive the draw-off of refined product or the introduction of desorbant, and a second chamber can be intended to receive a draw-off of extract or an introduction of batch. A washing fluid (internal reflux of the desired product, paraxylene, for example) that comes from the outside can also be introduced into said second chamber.

In addition to periods of drawing-off of extract and refined product and of the introduction of batch and desorbant into said chambers, the fluid of the first chambers of a distributor plate $P_i$ is drawn off, and it is then introduced, owing to the bypass line, into the two chambers of distributor plate $P_{i+1}$.

According to the first variant, during the period of drawing-off of the extract or the refined product, it is possible to draw off the extract or the refined product of the first chambers, for a plate $P_i$ the flow of the bypass line that supplies the second chambers of plate $P_{i+1}$ is canceled, and the fluid that comes from the first chambers of plate $P_{i-1}$ via the bypass line is introduced into the second chambers of plate $P_i$.

According to the second variant, during the period of drawing-off of the refined product, it is possible to draw off the refined product of the first chambers of a plate $P_i$, the flow of the bypass line that supplies the second chambers of plate $P_{i+1}$ is canceled, and the fluid that comes from the first chambers of plate $P_{i-1}$ via the bypass line is introduced into the two chambers of plate $P_i$.

During the period of drawing-off of the extract, it is possible to draw off the extract from the second chambers of a plate $P_i$, the flow of the bypass line that supplies the two chambers of plate Pi is canceled, and the fluid that comes from the first chambers of plate $P_i$ via the bypass line is introduced into the two chambers of plate $P_{i+1}$.

During the period of introduction of the desorbant, it is possible to introduce the desorbant into the first chambers of a plate $P_i$, the flow of the bypass line that supplies the two chambers of plate $P_{i+1}$ is canceled, and the fluid that comes from the first chambers of plate $P_{i-1}$ via the corresponding bypass line is introduced into the second chambers of plate $P_i$.

During the period of introduction of the batch, it is possible to introduce the batch into the second chambers of a plate $P_i$, the flow of the bypass line that supplies the second chambers of plate $P_i$ is canceled, the fluid of the first chambers of plate Pi is drawn off, and it is introduced, owing to the corresponding bypass line, into the second chambers of plate $P_{i+1}$.

According to a third variant of a distributor plate with two chambers per sector, whereby a first is intended to receive a draw-off of extract and a second is intended to receive an introduction of batch or desorbant or a draw-off of refined product, in addition to periods of drawing-off of extract and refined product and the introduction of the batch and desorbant in said chambers, it is possible to draw off the fluid of the first chambers of a distributor plate $P_i$ and to introduce it, owing to the bypass line, into two chambers of distributor plate $P_{i+1}$.

During one period of the cycle, it is possible to draw off the extract of the first chambers of a plate $P_i$, the flow of the bypass line that supplies the second chambers of plate $P_{i+1}$ is canceled, and the fluid that comes from the first chambers of plate $P_{i-1}$ via the bypass line is introduced into the two chambers of plate $P_i$.

During one period of the cycle, it is possible to draw off the refined product of the second chambers of a plate $P_i$, optionally the fluid of the first chambers of plate $P_{i-1}$ is drawn off via the bypass line between plates $P_{i-1}$ and $P_i$, and the fluid that comes from the first chambers of plate $P_i$ is introduced into the second chambers of plate $P_{i+1}$ via the bypass line between plates $P_i$ and $P_{i+1}$.

If the all-or-nothing valve on the bypass line between plate $P_{i-1}$ and $P_i$ is closed, the draw-off of the fluid that comes from the first chambers of plate $P_{i-1}$ is canceled.

During one period of the cycle relative to the first and third variants, it is possible to introduce from outside of the column the batch or desorbant into the second chambers of a plate $P_i$, the flow of fluid of the bypass line that supplies the second chambers of plate $P_i$ is canceled, and the fluid that is introduced into the second chambers of plate $P_{i+1}$ via the bypass line is drawn off from the first chambers of plate $P_i$.

When the distributor plate comprises four distribution chambers per sector, whereby a first is intended to receive a draw-off of extract, a second is intended to receive a draw-off of refined product, a third is intended to receive an introduction of desorbant, and a fourth is intended to receive an introduction of batch, it is possible to draw off the fluid of the first chambers and of the second chambers of a distributor plate $P_i$ and to introduce it respectively into the third and fourth chambers of plate $P_{i+1}$, in addition to periods for drawing off extract or refined product and for introducing desorbant or batch on said plate $P_i$.

During one period of the cycle, it is possible to draw off the extract of the first chambers of a plate $P_i$, the flow of fluid from the bypass line that supplies the third chambers of plate $P_{i+1}$ is canceled, whereby the third and the fourth chambers of plate $P_i$ respectively receive fluid from the first and second chambers of preceding plate $P_{i-1}$ via the bypass line and the second chambers of plate $P_i$ receive the fluid that supplies the fourth chambers of plate $P_{i+1}$ via the corresponding bypass line.

During one period of the cycle, it is possible to draw off the refined product of the second chambers of a distributor plate $P_i$, and the flow of fluid from the bypass line that supplies the fourth chambers of plate $P_{i+1}$ is canceled, whereby the third and the fourth chambers of plate $P_i$ respectively receive the fluid of the first and second chambers of preceding plate $P_{i-1}$ via the bypass line, and the first chambers of plate $P_i$ receive the fluid that supplies the third chambers of following plate $P_{i+1}$ via the corresponding bypass line.

During one period of the cycle, it is possible to introduce from the outside of the column desorbant into the third chambers of a plate $P_i$, the flow of fluid from the bypass line that supplies the third chambers of plate $P_i$ is canceled, whereby the first and second chambers of plate $P_i$ receive the fluid that respectively supplies the third and fourth chambers of plate $P_{i+1}$ via the bypass line and the fourth chambers of following plate $P_i$ receive the fluid of the second chambers of preceding plate $P_{i+1}$ via the corresponding bypass line.

During one period of the cycle, it is possible to introduce, from the outside of the column, the batch into the fourth chambers of a plate $P_i$, and the flow of fluid from the bypass line that supplies the fourth chambers is canceled, whereby the first and second chambers of distributor plate $P_i$ respectively supply the third and fourth chambers of following plate $P_{i+1}$ via the bypass line and the third chambers of plate $P_i$ receive the fluid of the first chambers of plate $P_{i-1}$ via the bypass line.

The invention also relates to the device for implementation of the process. More specifically, it relates to a device for chromatographic separation of a batch in a simulated fluid bed that comprises at least one column that is filled with a solid or adsorbent, whereby the column comprises a number of beds, a fluid distributor plate $P_i$ between each bed, whereby each distributor plate is divided into a number of sectors of distributor plates, whereby each distributor plate sector comprises at least one distribution chamber that is pierced with openings and a fluid circulation space in the vicinity of said openings of the chamber, whereby said chamber is connected to a transfer line that extends between the chamber and a point that is located outside of the column, whereby the device is characterized in that the transfer line relative to distribution chambers of a plate Pi is connected by a bypass line to the transfer line relative to the distribution chambers of another plate Pi+j that is arranged downstream (relative to the direction of advance of the switching of the transfer lines) and in that the bypass line comprises means for monitoring and adjusting the flow of fluid that circulates there, in such a way that the distribution chambers are flushed by a fluid which has approximately the same composition as that of the fluid that circulates through the circulation space at each of the chambers.

The means for monitoring and adjustment of the flow of fluid generally comprises a nonreturn valve and any other equivalent means.

These means comprise a means for measuring the flow of fluid that circulates in the bypass line and a valve for adjusting flow, optionally slaved to the means for measuring flow.

Furthermore, the bypass line can include a pump, generally arranged upstream from the means of measuring flow. It can also include an all-or-nothing valve, preventing any fluid from circulating there during the periods of injection or draw-off into or from the column.

According to a first embodiment of the device, each distributor plate sector can include a chamber, whereby the number of beds in the column is even and the number of distributor plates $P_n$ is odd, bypass line ($L_{1,2}$) connects the distribution chambers of distributor plate $P_1$ to those of distributor plate $P_2$, bypass line ($L_{3,4}$) connects the distribution chambers of distributor plate $P_3$ to those of distributor plate $P_4$, and bypass line ($L_n$) connects the distribution chambers of distributor plate $P_n$ to the line for recycling the main fluid of the last bed to the first bed.

According to another variant, whereby the number of beds is even and the number of distributor plates $P_n$ is odd, the bypass line connects the recycling line of the main fluid to the distribution chambers of distributor plate $P_1$, bypass line $L_{2,3}$ connects the distribution chambers of distributor plate $P_2$ to those of distributor plate $P_3$, and bypass line ($L_{n-1,n}$) connects the distribution chambers of distributor plate $P_{n-1}$ to those of distributor plate $P_n$.

According to another variant, whereby the number of beds is odd and the number of distributor plates $P_n$ is even, bypass line ($L_{1,2}$) connects the distribution chambers of distributor plate $P_1$ to those of distributor plate $P_2$, bypass line ($L_{3,4}$) connects the distribution chambers of distributor plate $P_3$ to those of distributor plate $P_4$, and bypass line ($L_{n-1,n}$) connects the distribution chambers of distributor plate $P_{n-1}$ to those of distributor plate $P_n$.

It may be advantageous for the bypass line to connect the chambers of a plate $P_i$ to those of a plate $P_{i+2}$. In this case, the chambers of plate $P_1$ can be connected to those of plate $P_2$ by the bypass line, or else the chambers of plate $P_{n-1}$ can be connected to those of plate $P_n$ by the bypass line.

According to a second advantageous embodiment of the device, each distributor plate sector $P_i$ of the column can include two fluid distribution chambers, a first that is suited for receiving a first fluid and a second that is suited for receiving a second fluid, and a first bypass line connects the first chambers of a plate $P_i$ to the second chambers of a plate $P_{i+1}$, and a second bypass line connects the first chambers of plate $P_{i+1}$ to the second chambers of plate $P_{i+2}$, and so on.

According to another variant, when distributor plate $P_i$ comprises two fluid distribution chambers per sector, with a first being suited for receiving a first fluid and a second being suited for receiving a second fluid, a first bypass line can connect the first chambers of a plate $P_i$ to the first chambers of a plate $P_{i+1}$, and a second bypass line connects the second chambers of plate $P_i$ to the second chambers of plate $P_{i+1}$.

According to a third embodiment of the device, each distributor plate sector $P_i$ of the column can include four fluid distribution chambers, with a first being suited for receiving a first fluid (extract), a second being suited for receiving a second fluid (refined product), a third being suited for receiving a third fluid (desorbant), and a fourth being suited for receiving a fourth fluid (batch). A first bypass line connects the first chambers of a plate $P_i$ to the third chambers of a plate $P_{i+1}$, and a second bypass line connects the second chambers of a plate $P_i$ to the fourth chambers of a plate $P_{i+1}$.

The invention finally relates to the use of the device for the separation of, in particular, paraxylene into a mixture of xylenes and ethylbenzene.

BRIEF DESCRIPTION OF THE DRAWINGS

The invention will be better understood based on the figures that diagrammatically illustrate preferred embodiments of the device, among which.

DESCRIPTION OF THE PREFERRED EMBODIMENTS

Figure 1:
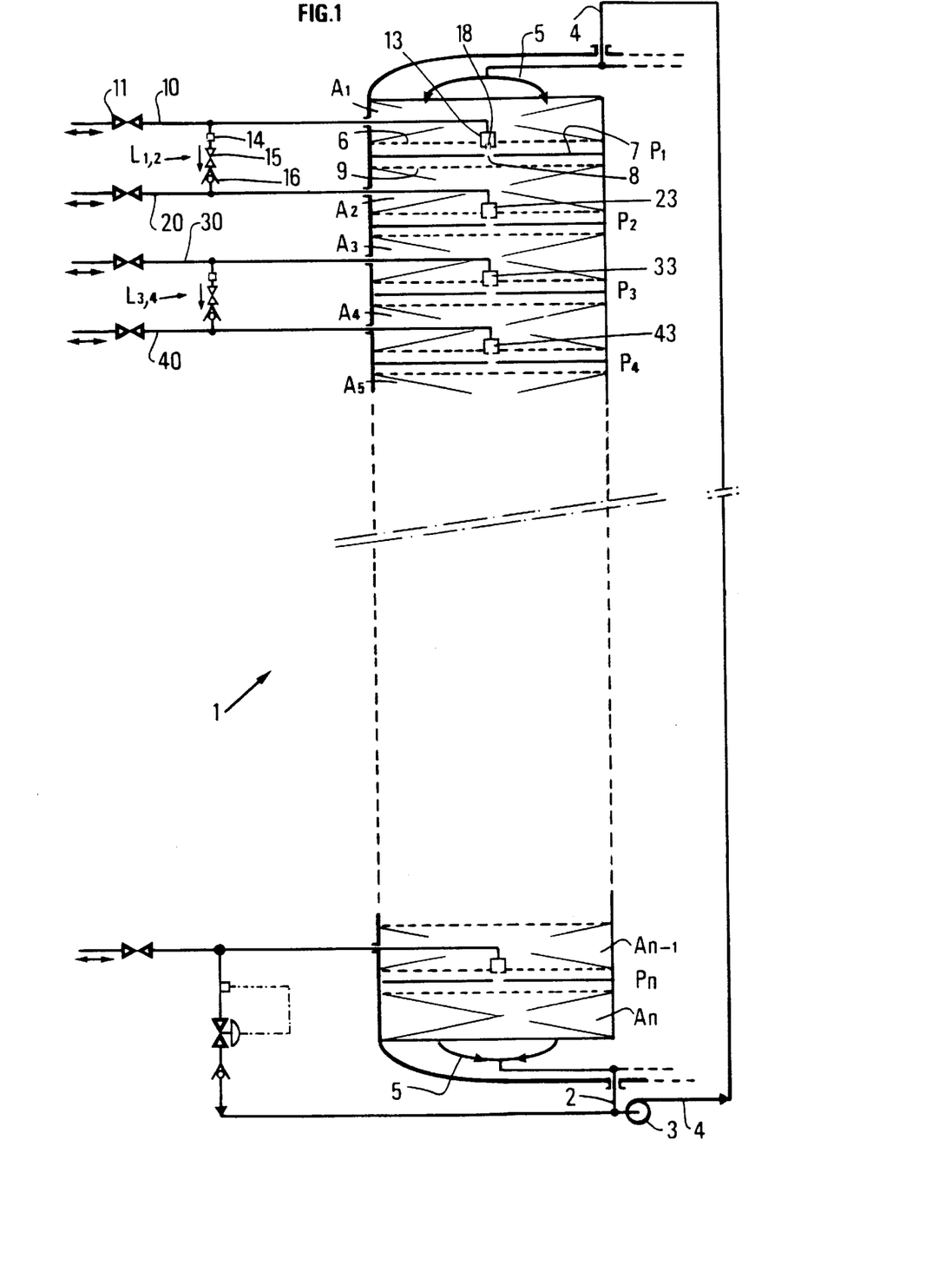
FIG. 1 shows, at the level of a sector, a longitudinal section of an adsorbent column, with a simulated fluid bed, with an even number of beds and with an odd number of distributor plates and with a single distribution chamber per sector, including bypass lines for a flow that is controlled according to the invention.

A cylindrical chromatographic column 1 that contains a number of beds An of an adsorbent, zeolitic molecular sieve BaX, for example, is shown according to FIG. 1.

Main fluid is drawn off from the lower end of the column by a line 2 to be recycled by a pump 3 and a line 4 to the upper end of this column where it is introduced into upper bed $A_1$ of adsorbent by lines 5.

To separate paraxylene from a batch of xylenes, generally two columns of twelve beds each are used, with the twenty-four beds being divided into at least four zones, with each zone being delimited by an injection of a fluid from the outside of the column (desorbant or batch, for example) and a draw-off of another fluid (extract or refined product, for example). For example, five beds are reserved in zone I, nine beds in zone II, seven beds in zone III, and three beds in zone IV. Under bed $A_1$ is located distributor plate $P_1$ for fluid that has to pass through the subsequent bed.

Figure 2:
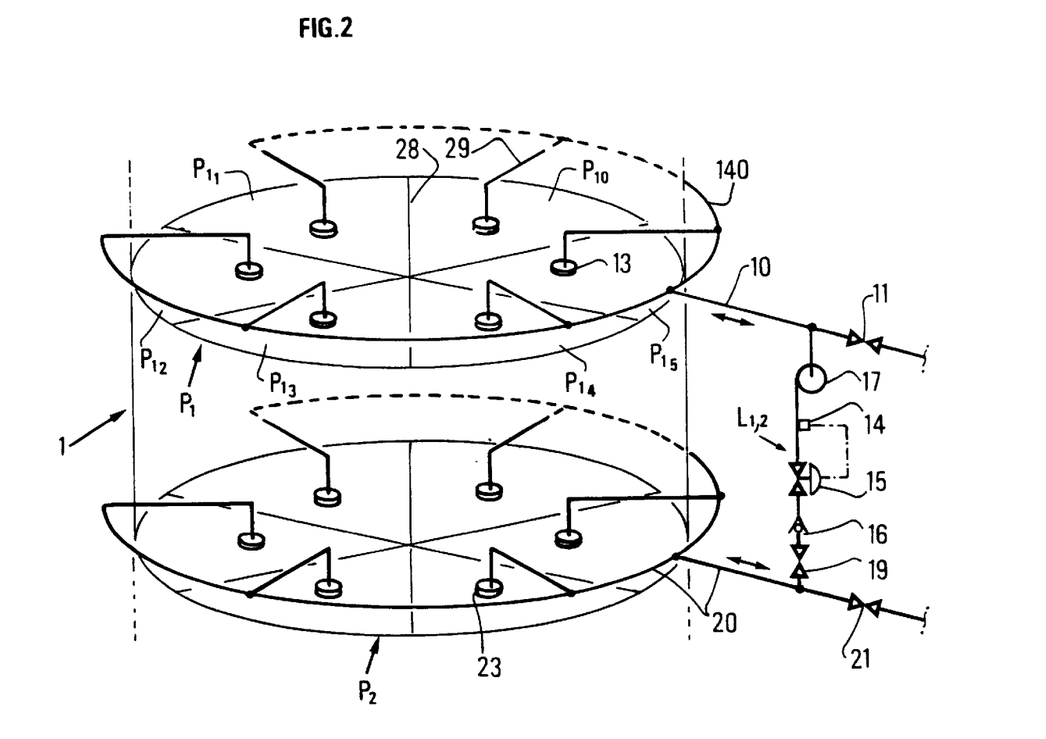
FIG. 2 illustrates two plates that are divided into sectors of plates that are connected to one another by the bypass line according to the invention.

Each distributor plate $P_1$ according to FIG. 2 is divided into sectors of plates $P_{10}$, $P_{11}$, $P_{12}$, $P_{13}$, $P_{14}$, and $P_{15}$ that are delimited by walls 28 which are either radial, as indicated in the figure, or approximately parallel to a diameter of the column. Each sector includes a fluid distribution chamber $C_i$ that is longitudinal in shape, either for the introduction of secondary fluid or for the draw-off of secondary fluid as indicated below, and each chamber is connected via a line 29 to a line 140. This line, which is located inside or outside the column, recovers the fluids from all the chambers and is connected to a transfer line 10 of secondary fluid.

Each distributor plate $P_i$ is located between two adsorbent beds. Each plate sector $P_{10}$ to $P_{15}$, which is diagrammatically shown in angular form in FIG. 1, comprises an upper grid 6 that supports upper adsorbent bed A1, which is approximately perpendicular to the axis of the column and makes possible the flow and collecting of fluid of bed $A_1$. It further includes two flat, nonperforated deflector plates 7 which are arranged on the same horizontal plane and between which a circulation space 8 of the fluid is arranged. A lower grid 9 under deflectors 7 makes it possible to spread the fluid uniformly in the lower adsorbent bed.

At each distributor plate $P_i$, secondary fluid transfer line 10, 20, which is connected to at least four secondary fluid transfer lines, not shown in FIG. 1 (batch injection line, desorbent injection line, line for drawing off an extract and line for drawing off a refined product) each comprising a sequential valve, symbolically shown by valve 11, 21 that is placed as close as possible to the bypass line. These sequential valves can be replaced by a rotary valve that ensures all the secondary fluid injections in the column or draw-offs of fluid from the column, whereby the bypassing of one line to the other according to the invention can be carried out outside or inside the rotary valve by the addition of rotating connections and appropriate calibrated lines or openings. All of said valves are connected to sequential switching control means that are suited for periodically advancing each secondary fluid injection point or draw-off of secondary fluid of a bed in the direction of circulation of the main fluid, i.e., from top to bottom. A simulated fluid bed that operates in countercurrent is thus provided.

In FIG. 1, each distribution chamber $C_i$ (13, 23, 33, 43) of secondary fluid includes in its lower portion openings 18 that are advantageously arranged above circulation space 8, by which the secondary fluid flows that are to be either introduced into the following bed after having been mixed in the main fluid that has passed through the main bed or are to be drawn off by the appropriate transfer line.

Distribution chambers 13 of plate $P_1$ are connected to distribution chambers 23 of distributor plate $P_2$ that is located between adsorbent beds $A_2$ and $A_3$, via a bypass line $L_{1,2}$. The fluid volume which passes through chambers 13, the portion of transfer line 10 up to the bypass line, bypass line $L_{1,2}$, and the portion of transfer line 20 that communicates with distribution chambers 23 of plate $P_2$, as well as said chambers 23, is well known.

Each bypass line ($L_{1,2}$, $L_{3,4}$, ...) includes a flowmeter, a valve 15 for flow control slaved to a flowmeter, and a downstream nonreturn valve 16 that is suited only for circulating fluid from chambers 13 to chambers 23. A pump 17 optionally makes it possible to make up an inadequate pressure drop between the chambers of the two plates. An all-or-nothing valve 19 that is arranged on the bypass line can prevent any circulation of fluid in the bypass line.

The device with a single distribution chamber per distributor plate sector can operate in the following way: during the period of drawing-off of an extract by line 10, valve 11 is opened, the extract is drawn off by chambers 13 of plate $P_1$, and nonreturn valve 16 prevents any circulation of the fluid in circulation line $L_{1,2}$. During the subsequent period, with valve 11 being closed, the extract of plate $P_{i+1}$ is drawn off via chambers 23 and that of plate $P_i$ is drawn off via chambers 13, with valve 21 being open and the circulation of the extract in the bypass line being reestablished with a flow as indicated above. The procedure would be the same for drawing off refined product on plates $P_j$ and $P_{j+1}$ during the cycle.

According to another variant where the bypass line includes valve 19, when the extract is drawn off by line 20 and open valve 21, any draw-off of plate $P_j$ by line 10 is prevented by closing this valve 19.

During the batch injection period during the cycle, it is possible to introduce one portion of the batch into plate $P_k$ via distribution chambers 13 and batch transfer line 10 and the other, smaller, portion into plate $P_{k+1}$ via the bypass line, line 20, and chambers 23, whereby valve 11 is open and valve 21 is closed.

During the subsequent period, valve 11 is closed, valve 21 is opened, the entire batch is sent into chambers 23 of distributor plate $P_{k+1}$, and the flow from the bypass line is canceled by the nonreturn valve. The procedure would be the same for the introduction of desorbant into plates $P_l$ and $P_{l+1}$ during the cycle.

According to another variant, when the batch is introduced into plate $P_k$, it is possible to close valve 19 on the bypass line to prevent any transfer of fluid into plate $P_{k+1}$.

On plates $P_i$ and $P_{i+1}$, which do not receive any secondary fluid (neither injection of batch or desorbant, nor draw-off of extract or refined product), valves 11, 21 to transfer lines 10 and 20 are closed, and the main fluid that comes from bed $A_1$ is collected in deflectors 7 and flows off through circulation space 8. A portion circulates through the openings of chambers 13 of plate $P_i$, flushes chambers 13, transfer lines 29, line 140, transfer line 10, and bypass line $L_{1,2}$ and reaches line 20 to transfer the fluid at a flow rate that is controlled by flowmeter 14 and valve 15 that is slaved to the flowmeter. Nonreturn valve 16 remains open. At the end of a period, the fluid is introduced into chambers 23 of plate $P_{i+1}$, which are thus flushed by a fluid that has approximately the same composition as that of the fluid, having passed during the period through bed $A_2$, which circulates in circulation space 8. The fluid from chambers 23 is evacuated through openings 18 into circulation space 8 where it is mixed with that which passed through the preceding bed.

Figure 3:
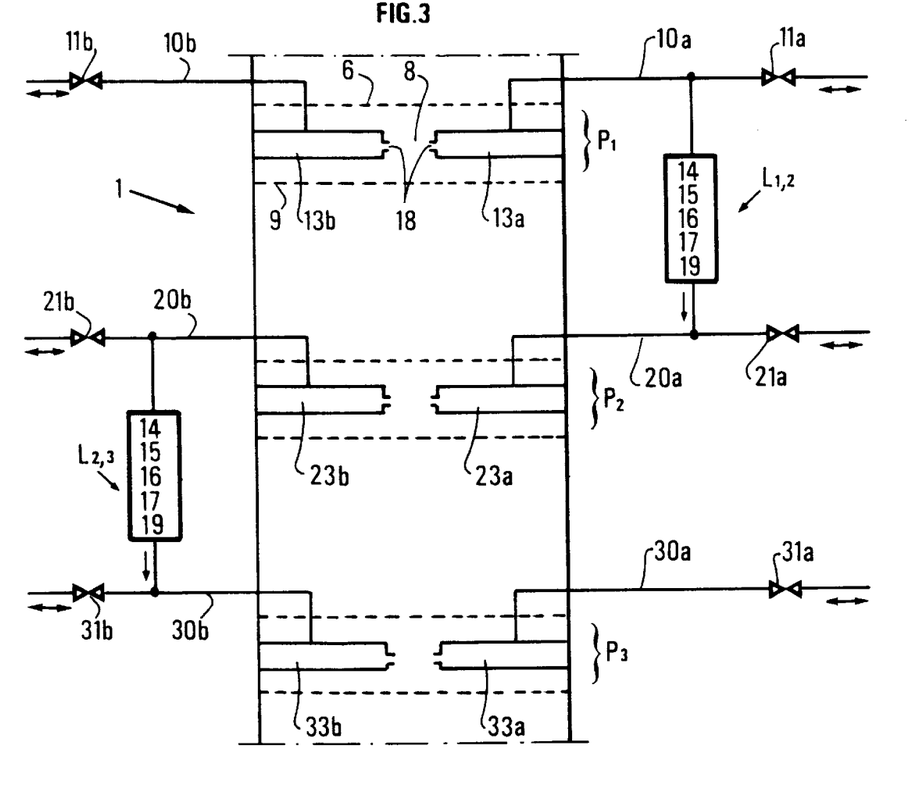
FIG. 3 shows a longitudinal section of a column where each distributor plate comprises two distribution chambers per sector along a radial plane.

FIG. 3 illustrates a sector $P_{10}$ of a distributor plate $P_1$ that comprises two chambers 13a, 13b for the distribution of a fluid that act as fluid deflectors, with the same references for the same means as those of FIGS. 1 and 2. Their openings roughly face one another (although preferably arranged in staggered rows) at space 8. First chambers 13a are suited for receiving a first fluid, and second chambers 13b are suited for receiving a second fluid. The connecting lines of all first chambers 13a of a same distribution plate $P_1$ are connected to line 10a for transfer of a fluid. This transfer line 10a of plate $P_1$ communicates with transfer line 20a of plate $P_2$ by bypass line $L_{1,2}$, which includes means 14, 15 and 16 and optionally 17 and 19 that are mentioned in FIG. 2. Line 20a is connected to all second chambers 23a of plate $P_2$.

First chambers 23b that correspond to the sectors of distributor plate $P_2$ are connected by a bypass line $L_{2,3}$ that is approximately identical to line $L_{1,2}$ and by a transfer line 30b, in second chambers 33b of distributor plate $P_3$. During one period of the cycle where a draw-off is carried out, for example, the extract from first chambers 23b of plate $P_2$ is drawn off, the flow from the bypass line that supplies plate $P_3$ is canceled by the nonreturn valve, and the fluid that comes from the first chambers of plate $P_1$ is introduced into second chambers 23a of plate $P_2$, whereby the nonreturn valve is open, and valves 11a and 21a are closed.

The draw-off of the refined product can be carried out under the same conditions.

During the period of the cycle where the introduction of desorbant or of batch is done, batch is introduced from the outside of the column into, for example, second chambers 23a of a plate $P_2$, whereby valve 21a is open and the nonreturn valve is closed in bypass line $L_{1,2}$, and the fluid that is introduced into second chambers 33b of plate $P_3$ is drawn off from first chambers 23b of plate $P_2$ via bypass line $L_{2,3}$, whereby valves 21b and 31b are closed.

In addition to draw-off or introduction points in said chambers of the column, the fluid is drawn off from the first chambers of plate $P_1$, whereby valve 11a is closed, and it is introduced, owing to line $L_{12}$, at a controlled flow rate into the second chambers of plate $P_2$, whereby valve 21a is closed.

The two chambers are depicted in a horizontal plane, but they can be arranged in or above circulation space 8 between deflector plates 7.

Figure 4:
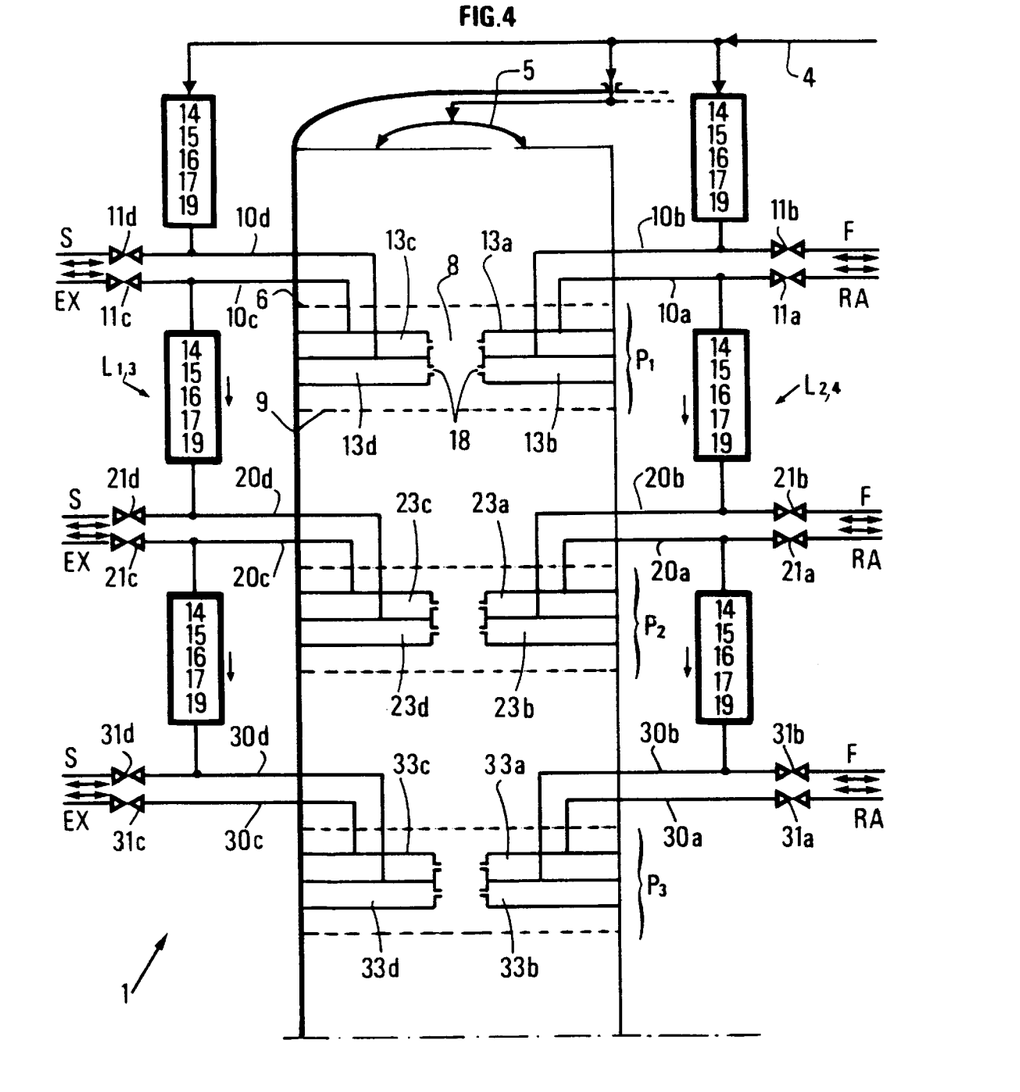
FIG. 4 depicts a longitudinal section of a column where each distributor plate comprises four distribution chambers per sector.

FIG. 4 illustrates a fluid distributor plate $P_1$, which has four independent chambers 13a, 13b, 13c and 13d per sector and additionally acts as a fluid deflector. The same means of FIGS. 1 and 2 have the same functions and the same references.

Second chambers 13a are suited for receiving refined product. They are connected to valve 11a by transfer line 10a.

Fourth chambers 13b under the second chambers are suited for receiving the batch. Transfer line 10b and its valve 11b supply it.

First chambers 13c on the same plane as the second chambers are suited for receiving the extract. Transfer line 10c and its valve 11c make it possible to draw it off toward the outside of the column.

Third chambers 13d under the first chambers are suited for receiving desorbant. Transfer line 10d and its valve lid supply it.

Openings 18 of four chambers 13a, 13b, 13c and 13d are open in circulation space 8.

At each sector of plate $P_2$, same chambers 23a, 23b, 23c and 23d are encountered in the same positions as above, as well as the elements that are attached to them.

Second chambers 13a of plate $P_1$ are connected to fourth chambers 23b of plate $P_2$ by bypass line $L_{2,4}$ and first chambers 13c of plate $P_1$ are connected to third chambers 23d of plate $P_2$ by bypass line $L_{1,3}$.

In addition to periods of draw-off of fluid (extract or refined product) and introduction of fluid (batch, desorbant), the fluid is drawn off from first chambers 13c and second chambers 13a of plate $P_1$ and is introduced into, respectively, third chamber 23d and fourth chamber 23b of plate $P_2$ and so on.

Chambers 13d and chambers 13b of plate $P_1$ are supplied from the main fluid (line 4) that is recycled by recycling pump 3 (see FIG. 1), and valves 11a, 11b, 11c and 11d as well as valves 21a, 21b, 21c and 21d are closed.

During a period of the cycle relative to the draw-off of the extract, the extract is usually drawn off from first chambers 23c of plate $P_2$, and the flow of fluid from line $L_{1,3}$ that supplies third chambers 33d of plate $P_3$ is canceled, whereby the third and fourth chambers of plate $P_2$, receive, respectively the fluid from the first and second chambers of plate $P_1$ via the corresponding bypass line.

During one period of the cycle relative to the draw-off of the refined product, more generally, the refined product is drawn off from the second chambers of a plate $P_i$, and the flow of fluid from bypass line $L_{2,4}$ that supplies the fourth chambers of plate $P_{i+1}$ is canceled, whereby the third and fourth chambers of plate $P_i$ receive, respectively, the fluid from the first and second chambers of preceding plate $P_{i+1}$ via the corresponding bypass line.

During one period of the cycle relative to the introduction of the desorbant, desorbant from the outside of the column is introduced into the third chambers of a plate $P_i$, and the flow of fluid from the bypass line that supplies the third chambers of plate $P_i$ is canceled, whereby the first and second chambers of plate $P_i$ receive the fluid that respectively supplies the third and fourth chambers of plate $P_{i+1}$ via the bypass line, and the fourth chambers of subsequent plate $P_i$ receive the fluid from the second chambers of preceding plate $P_{1-1}$ via the corresponding bypass line.

During one period of the cycle relative to the introduction into the column of the batch in the fourth chambers of a plate $P_i$, the flow of fluid from the bypass line that supplies the fourth chambers of plate $P_i$ is canceled, whereby the first and second chambers of plate $P_i$ supply, respectively, the third and fourth chambers of subsequent plate $P_{i+1}$ via the corresponding bypass lines and the third chambers of plate $P_i$ receive the fluid from the first chambers of plate $P_{i-1}$ via the corresponding bypass line.

EXAMPLE

As a sample embodiment according to the invention, the case of a paraxylene separation unit from a batch that mainly comprises a mixture of orthoxylene, metaxylene, paraxylene, and ethylbenzene is described. This unit operates according to the principle of adsorption in a simulated fluid bed and includes two adsorbers that have a diameter of 4.80 m and are arranged in a series of 12 adsorbent beds each, for example, a faujasite exchanged with barium.

Between each bed are arranged distributor plates, whereby each plate sector includes two distribution chambers, and the first chamber is intended to receive an introduction of solvent or a draw-off of refined product, and the second chamber is intended to receive an introduction of batch or a draw-off of extract (see FIG. 3).

Under normal operating conditions, the pressure drop on a bed between two successive distributor plates is about 0.31 kg/cm². The period that defines the switching period of the injections and draw-off from one bed to the other and therefore represents the period of advance of the concentration sections from one bed to the other is 84 seconds when it is known that the mean flow of fluid that circulates through the beds is 800 m³/h.

In the absence of a device according to the invention, a parasitic recirculation flow from one portion of the sectors of a plate to the other sectors of the same plate is estimated on each distributor plate on the order of 1 to 3 m³/h, whereby this flow is due to small pressure differences that exist between the sectors of the same plate.

To correct this recirculation phenomenon, which is detrimental to performance levels of the process, a bypass line according to the invention that connects the first chambers of plate $P_i$ to the second chambers of plate $P_{i+1}$ (cf. FIG. 4) is arranged, at each stage, between two successive distributor plates.

For the first bed of each adsorber, the bypass line connects main line 4 to the second chambers of plate $P_1$ (cf. FIG. 4).

For the last bed of each adsorber, the bypass line connects the first chamber of plate Pn to main line 2 (cf. FIG. 1).

On each of the bypass lines are arranged a device for measuring flow, a valve for adjusting the flow, a nonreturn valve, and a valve (19) having sequential opening/closing, whereby each of these elements is selected to ensure a small pressure drop.

The optimum flow rate in the bypass line between two consecutive plates $P_i$ and $P_{i+1}$ is determined as follows:

volume of the first chambers of distribution and pipes that are associated with plate $P_i$: 276 l volume of the bypass line: 170 l volume of the second distribution chambers and pipes that are associated with plate $P_{i+1}$: 228 l total volume to be circulated between two successive plates: 674 l target flow in the bypass line:

$$\frac{6741 \times 3{,}600 \text{ sec.}}{84 \text{ sec.}} = 28{,}886 \text{ l/h}$$

or approximately 29 m3/h.

This flow rate can be ensured without a pump owing to the pressure drop that is available between two distributor plates and the small pressure drops of elements that are used in the bypass line.

Furthermore, since this flow rate is considerably higher than the parasitic recirculation flow on a plate, the effects of the parasitic recirculation are canceled.

It has been demonstrated that, owing to this device according to the invention:

It is readily possible to obtain purities of paraxylene of greater than 99.9%, it is no longer necessary to rinse the lines prior to drawing off the desired product, which is reflected by the fact that the fluid bed is operated in simulated countercurrent in only 4 zones rather than in 5 or 6 zones, as were necessary according to the prior art.

We claim:

1. Process for chromatographic separation of a batch in a simulated fluid bed device that includes a number of beds (A1 to An) of a solid or adsorbent that are contained in at least one chromatographic column, a fluid distributor plate ($P_i$) between each bed, whereby each distributor plate is divided into a number of sectors (P10, P11, P12), whereby each distributor plate sector (Pi) includes at least one distribution chamber (13) that is pierced with openings (18) and a fluid circulation space (8) in the vicinity of said openings of the chamber, and whereby said chamber is connected to a transfer line (10) that extends between the chamber and a point that is located outside of the column; during a period T of the cycle, an injection of the batch, a draw-off of a refined product, injection of desorbant, and draw-off of an extract into and from a distribution chamber that belongs to different plates are carried out, with the process being characterized in that, at an appropriate flow rate, a fluid volume is permanently circulated that circulates in the column in a bypass line (L1, 2) that connects the chambers of a distributor plate $P_i$ to the chambers of another downstream distributor plate $P_{i+j}$, at least one bed away, for at least one period T of the cycle, whereby period T corresponds to the circulation period of the fluid in an adsorbent bed, whereby said distribution chambers receive, during said period, neither batch injection or desorbant injection nor the draw-off of a refined product or an extract, and whereby the fluid flow circulating in the bypass line and in the chambers is adjusted in such a way that said circulation chambers are flushed by a fluid that has approximately the same composition as that of the fluid that circulates through the circulation space at each of plate chambers $P_i$ and $P_{i+j}$, wherein i, j and n are integers.

2. Process according to claim 1, wherein said distributor plate chambers are separated by an adsorbent bed.

3. Process according to claim 1, wherein the flow rate of fluid that circulates in the bypass line is the quotient of the volume that is available in the distribution chambers in question and the bypass line, divided by the period of the cycle, plus or minus 50% and preferably plus or minus 15%.

4. Process according to claim 1, wherein said distributor plate chambers are separated by two adsorbent beds.

5. Process according to claim 4, wherein the flow of fluid that circulates in the bypass line is the quotient of the volume that is available in the distribution chambers and the bypass line, divided by twice the period of the cycle, plus or minus 50% and preferably plus or minus 15%.

6. Process according to claim 1, wherein during one period, the flow of the fluid that circulates in the bypass line between distribution plates $P_i$ and $P_{i+1}$ is canceled when the chambers of distributor plate P receive the injection of batch or desorbant or any other fluid (flush-in) or the draw-off of refined product or extract or any other fluid (flush-out).

7. Process according to claim 1, wherein during the period of draw-off of an extract or a refined product, on a given distributor plate that includes only a single chamber per sector, the extract or the refined product of plate $P_i$ is drawn off, whereby the bypass flow is canceled (by the nonreturn valve) and during the subsequent period, the extract or the refined product is drawn off from plate $P_{i+1}$ and plate $P_i$, whereby the circulation of fluid in the bypass line is reestablished.

8. Process according to claim 1, wherein during the injection period of batch or desorbant, a portion of the batch or desorbant is introduced into an appropriate plate $P_i$ via the bypass line and during the subsequent period, the entire batch is sent into subsequent distributor plate $P_{i+1}$, whereby the bypass flow is canceled (by the nonreturn valve).

9. Process according to claim 1, wherein each distributor plate sector includes two distribution chambers (13a, 13b), a first that is intended for receiving a draw-off of extract or refined product and a second that is intended to receive an introduction of batch or desorbant and wherein, in addition to the periods for drawing off extract and refined product and for introducing batch and desorbant in said chambers, the fluid from the first chambers of a distributor plate $P_i$ is drawn off and is introduced, owing to the bypass line, into the second chambers of distributor plate $P_{i+1}$.

10. Process according to claim 9, wherein during one period, the extract or the refined product is drawn off from the first chambers of a plate $P_i$, the flow of the bypass line that supplies the second chambers of plate $P_{i+1}$ is canceled, and the fluid that comes from the first chambers of plate $P_{i-1}$ is introduced into two chambers of plate $P_i$ via the bypass line.

11. Process according to claim 9, wherein during one period of the cycle, batch or desorbant is introduced from the outside of the column into the second chambers of a plate $P_i$, the flow of fluid from the bypass line that supplies the second chambers of plate $P_i$ is canceled, and the fluid that is introduced into the second chambers of plate $P_{i+1}$ is drawn off from the first chambers of plate $P_i$ via the bypass line.

12. Process according to claim 1, wherein each distributor plate sector includes two distribution chambers, a first that is intended to receive a draw-off of extract and a second that is intended to receive an introduction of batch or desorbant or a draw-off of refined product, and wherein in addition to periods of draw-off of extract and refined product and of introduction of batch and desorbant in said chambers, the fluid is drawn off from the first chambers of a distributor plate $P_i$ and is introduced, owing to the bypass line, into the two chambers of distributor plate $P_{i+1}$.

13. Process according to claim 12, wherein, during one period, the extract is drawn off from the first chambers of a plate $P_i$, the flow of the bypass line that supplies the second chambers of plate $P_{i+1}$ is canceled, and the fluid that comes from the first chambers of plate $P_{i-1}$ is introduced into the second chambers of plate $P_i$ via the bypass line.

14. Process according to claim 12, wherein during one period, the refined product is drawn off from the second chambers of a plate $P_i$, the fluid is drawn off from the first chambers of plate $P_{i-1}$ via the bypass line between plates $P_{i-1}$ and $P_i$, and the fluid that comes from the first chambers of plate $P_i$ is introduced into the second chambers of plate $P_{i+1}$ via the bypass line between plates $P_i$ and $P_{i+1}$.

15. Process according to claim 1, wherein each distributor plate sector includes two distribution chambers, a first that is intended to receive a draw-off of refined product or an introduction of desorbant and a second that is intended to receive an introduction of batch, desorbant or a draw-off of extract and wherein, in addition to periods of drawing off extract and refined product and of introducing batch and desorbant in said chambers, the fluid is drawn off from the first chambers of a distributor plate $P_i$ and is introduced, owing to the bypass line, into the second chambers of distributor plate $P_{i+1}$.

16. Process according to claim 15, wherein during one period, the refined product is drawn off from the first chambers of a plate $P_i$, the flow of the bypass line that supplies the second chambers of plate $P_{i+1}$ is canceled, and the fluid that comes from the first chambers of plate $P_{i-1}$ is introduced into the second chambers of plate Pi via the bypass line.

17. Process according to claim 15, wherein during one period, the extract is drawn off from the second chambers of a plate $P_i$, the flow of the bypass line that supplies the second chambers of plate $P_i$ is canceled, and the fluid that comes from the first chambers of plate $P_i$ is introduced into the second chambers of plate $P_{i+1}$ via the bypass line.

18. Process according to claim 15, wherein during one period, the desorbant is introduced into the first chambers of a plate $P_i$, the flow of the bypass line that supplies the second chambers of plate $P_{i+1}$ is canceled, and the fluid that comes from the first chambers of plate $P_{i-1}$ is introduced into the second chambers of plate $P_i$ via the corresponding bypass line.

19. Process according to claim 15, wherein during one period, the batch is introduced into the second chambers of a plate $P_i$, the flow of the bypass line that supplies the second chambers of plate $P_i$ is canceled, and the fluid is drawn off from the first chambers of plate $P_i$ and is introduced, owing to the corresponding bypass line, into the second chambers of plate $P_{i+1}$.

20. Process according to claim 1, wherein each distributor plate sector includes four distribution chambers, a first that is intended to receive a draw-off of extract, a second that is intended to receive a draw-off of refined product, a third that is intended to receive an introduction of desorbant, and a fourth that is intended to receive an introduction of batch, and wherein the fluid is drawn off from the first chambers and second chambers of a distributor plate $P_i$ and is introduced into, respectively, the third and fourth chambers of plate $P_{i+1}$, in addition to periods of drawing off extract or refined product and introduction of desorbant or batch in said plate $P_i$.

21. Process according to claim 20, wherein during one period of the cycle, the extract is drawn off from the first chambers of a plate $P_i$ and the flow of fluid of the bypass line that supplies the third chambers of plate $P_{i+1}$ is canceled, whereby the other chambers receive fluid according to claim 20.

22. Process according to claim 20, wherein during one period of the cycle, the refined product is drawn off from the second chambers of a distributor plate $P_i$ and the flow of fluid of the bypass line that supplies the fourth chambers of plate $P_{i+1}$ is canceled, whereby the other chambers receive fluid according to claim 20.

23. Process according to claim 20, wherein during one period of the cycle, desorbant is introduced from the outside of the column into the third chambers of a plate $P_i$ and the flow of fluid of the bypass line that supplies the third chambers of plate $P_i$ is canceled, whereby the other chambers receive fluid according to claim 20.

24. Process according to claim 20, wherein during one period of the cycle, the batch is introduced from the outside of the column into the fourth chambers of a plate $P_i$ and the flow of fluid of the bypass line that supplies the fourth chambers is canceled, whereby the other chambers receive fluid according to claim 20.

25. The process according to claim 1, wherein said process separates at least one aromatic isomer with eight carbon atoms in a mixture of xylenes and ethylbenzene.

26. The process according to claim 25, wherein said bypass line includes means (14, 15, 16) for monitoring and adjusting the flow of fluid that circulates in said bypass line.

* * * * *